US012671858B2

(12) United States Patent
Zhang et al.

(10) Patent No.: US 12,671,858 B2
(45) Date of Patent: Jun. 30, 2026

(54) INTERACTION METHOD AND APPARATUS, AND DEVICE, COMPUTER-READABLE STORAGE MEDIUM AND PRODUCT

(71) Applicant: Beijing Bytedance Network Technology Co., Ltd., Beijing (CN)

(72) Inventors: Tiantian Zhang, Beijing (CN); Wenjing Liu, Beijing (CN); Haiqian Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/541,766

(22) Filed: Dec. 15, 2023

(65) Prior Publication Data

US 2024/0114196 A1 Apr. 4, 2024

Related U.S. Application Data

(63) Continuation of application No. PCT/CN2022/104051, filed on Jul. 6, 2022.

(30) Foreign Application Priority Data

Jul. 12, 2021 (CN) .......................... 202110786221.6

(51) Int. Cl.
*H04N 7/173* (2011.01)
*G06F 3/0488* (2022.01)
(Continued)

(52) U.S. Cl.
CPC ......... *H04N 21/431* (2013.01); *G06F 3/0488* (2013.01); *H04N 21/47217* (2013.01)

(58) Field of Classification Search
CPC ............ H04N 21/431; H04N 21/47217; G06F 3/0488
See application file for complete search history.

(56) References Cited

U.S. PATENT DOCUMENTS 9,639,634 B1 * 5/2017 Greene ............... G06F 16/4387
10,936,176 B1 * 3/2021 Clark ..................... G06Q 40/08
(Continued)

FOREIGN PATENT DOCUMENTS

| | | |
|---|---|---|
| CN | 108434736 A | 8/2018 |
| CN | 110020389 A | 7/2019 |

(Continued)

OTHER PUBLICATIONS

ISA China National Intellectual Property Administration, International Search Report Issued in Application No. PCT/CN2022/104051, Sep. 14, 2022, 11 pages.
(Continued)

*Primary Examiner* — Annan Q Shang
(74) *Attorney, Agent, or Firm* — Alleman Hall LLP

(57) ABSTRACT

The present disclosure relates to an interaction method and apparatus, and a device, a computer-readable storage medium and a product. The method comprises: during the process of a live room playing a live video, in response to a change of interaction data in the live room, updating the display of a first progress bar, which is presented in a live video interface and corresponds to a target interaction control; and in response to triggering of the target interaction control, displaying an interaction interface, wherein the interaction interface comprises a virtual resource corresponding to the interaction data.

20 Claims, 8 Drawing Sheets

During the process of a virtual live broadcast room playing a live broadcast video, in response to a change of interaction data in the virtual live broadcast room, update the display of a first progress bar, which is presented in a live broadcast video interface and corresponds to a target interaction control — S110

In response to triggering of the target interaction control, display an interaction interface, wherein the interaction interface comprises a virtual prop corresponding to the interaction data — S120

(51) Int. Cl.
  H04N 21/431 (2011.01)
  H04N 21/472 (2011.01)

(56) References Cited

U.S. PATENT DOCUMENTS

| | | | | |
|---|---|---|---|---|
| 2015/0040176 A1* | 2/2015 | Hybertson | ........... | H04N 21/812 |
| | | | | 725/131 |
| 2015/0135206 A1* | 5/2015 | Reisman | ................ | H04H 20/93 |
| | | | | 725/18 |
| 2015/0135214 A1* | 5/2015 | Reisman | ................ | H04H 60/35 |
| | | | | 725/37 |
| 2015/0243327 A1* | 8/2015 | Zhang | .................. | H04N 21/435 |
| | | | | 725/88 |
| 2015/0249859 A1* | 9/2015 | Hartley | ........... | H04N 21/41265 |
| | | | | 375/240.02 |
| 2017/0195746 A1* | 7/2017 | Gupta | .................. | H04N 21/812 |
| 2018/0234738 A1 | 8/2018 | Sarkar et al. | | |
| 2020/0302179 A1* | 9/2020 | Gao | ....................... | H04N 21/84 |
| 2021/0185393 A1* | 6/2021 | Kalaichelvan | ... | H04N 21/44029 |

FOREIGN PATENT DOCUMENTS

| | | | |
|---|---|---|---|
| CN | 110708565 | A | 1/2020 |
| CN | 110944235 | A | 3/2020 |
| CN | 111212314 | A | 5/2020 |
| CN | 112188297 | A | 1/2021 |
| CN | 112291575 | A | 1/2021 |
| CN | 110213612 | B | 5/2021 |
| CN | 112950294 | A | 6/2021 |
| CN | 113179417 | A | 7/2021 |
| JP | 2020017871 | A | 1/2020 |
| JP | 2020086750 | A | 6/2020 |
| JP | 2020087412 | A | 6/2020 |

OTHER PUBLICATIONS

First Office Action for Chinese Application No. 202110786221.6, mailed on Oct. 25, 2024, 20 pages.
Japan Patent Office, Notice of Refusal for Japanese Application No. 2023-578019, mailed Dec. 3, 2024, 12 pages.

* cited by examiner

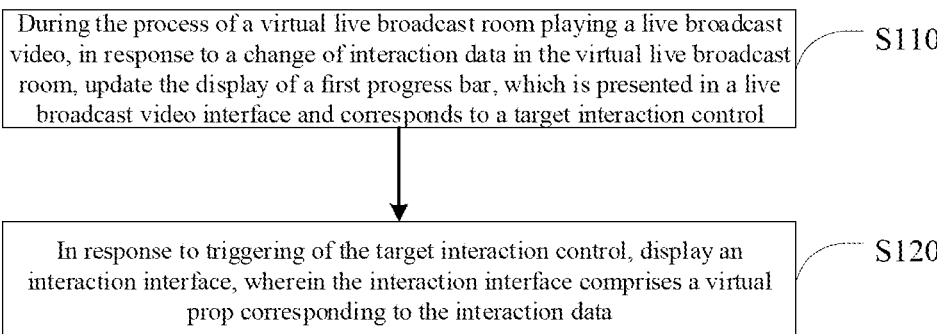

During the process of a virtual live broadcast room playing a live broadcast video, in response to a change of interaction data in the virtual live broadcast room, update the display of a first progress bar, which is presented in a live broadcast video interface and corresponds to a target interaction control — S110

In response to triggering of the target interaction control, display an interaction interface, wherein the interaction interface comprises a virtual prop corresponding to the interaction data — S120

FIG.1

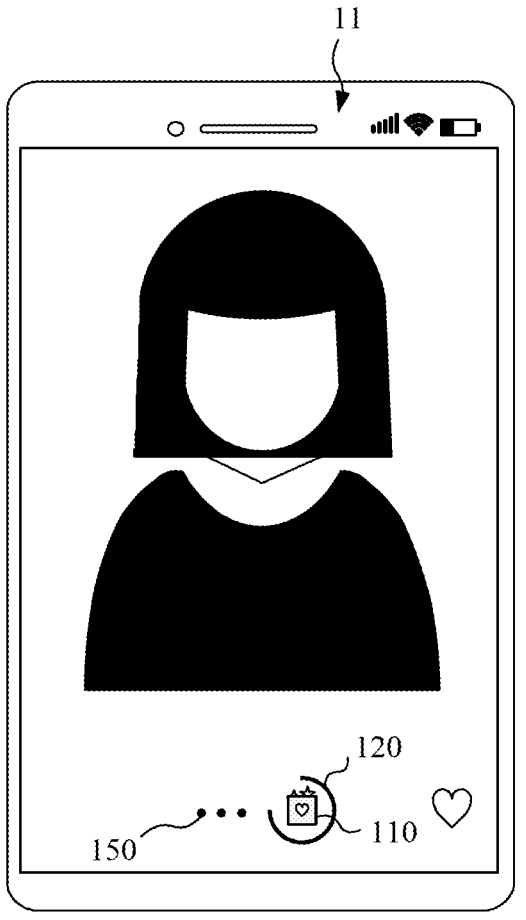

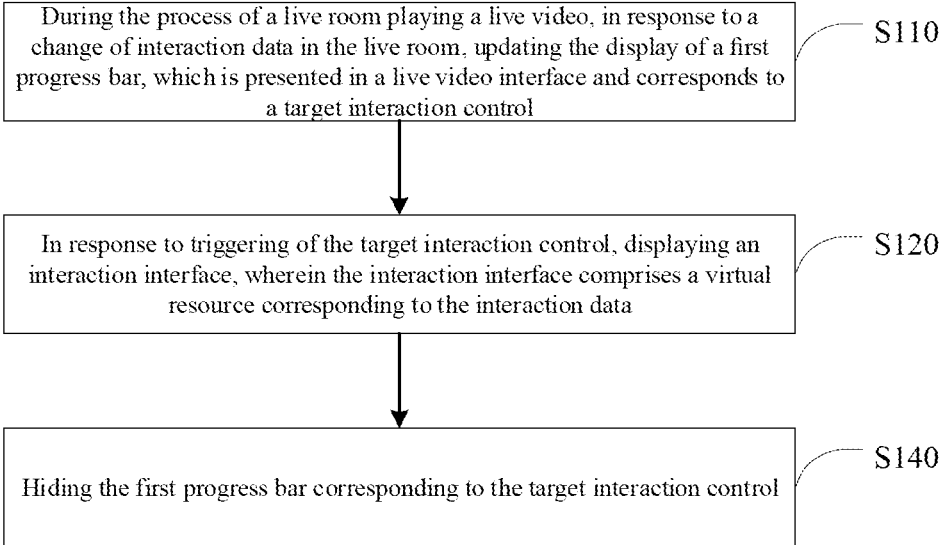

During the process of a live room playing a live video, in response to a change of interaction data in the live room, updating the display of a first progress bar, which is presented in a live video interface and corresponds to a target interaction control — S110

In response to triggering of the target interaction control, displaying an interaction interface, wherein the interaction interface comprises a virtual resource corresponding to the interaction data — S120

Hiding the first progress bar corresponding to the target interaction control — S140

FIG.5

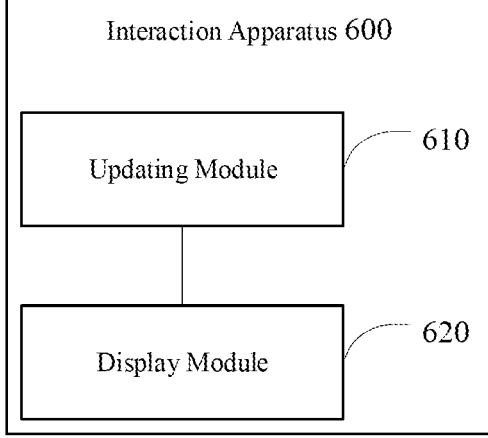

Interaction Apparatus 600

Updating Module — 610

Display Module — 620

FIG.6

INTERACTION METHOD AND APPARATUS, AND DEVICE, COMPUTER-READABLE STORAGE MEDIUM AND PRODUCT

CROSS-REFERENCE TO RELATED APPLICATION

The present application is a continuation of International Patent Application No. PCT/CN2022/104051, filed on Jul. 6, 2022 which claims priority of the Chinese Patent Application No. 202110786221.6 filed to State Intellectual Property Office on Jul. 12, 2021 and entitled "Interaction Method, Apparatus, Device, Computer Readable Storage Medium and Product", the disclosure of which is incorporated herein by reference in its entirety.

TECHNICAL FIELD

The present disclosure relates to the technical field of live-streaming, in particular to an interaction method, apparatus, device, computer readable storage medium and product.

BACKGROUND

During the process of watching a live video (i.e., livestream video) played in a live room, users can interact with the host in real time to enhance the communication of the live video.

The existing interaction mode of the live room is mainly that users perform operations, such as commenting and liking, etc., on the live video on the live video interface, that is, the users type the comment content on a public screen, or enter it into a comment area, or click a liking control to give liking to the video content, so as to realize the interaction with the host.

However, using the existing technology, the interaction mode is relatively simple, and it is difficult to promote the user's willingness to interact.

SUMMARY

In order to solve the above technical problem or at least partially solve the above technical problem, the present disclosure provides an interaction method, apparatus, device, computer readable storage medium and product.

In a first aspect, the present disclosure provides an interaction method including:

updating, during a process of playing a live video in a live room, a display of a first progress bar, which is presented in a live video interface and corresponds to a target interaction control in response to a change of interaction data in the live room; and displaying an interaction interface in response to triggering of the target interaction control, wherein the interaction interface includes a virtual resource corresponding to the interaction data.

In a possible design, the virtual resource is in a triggerable state in a case where a progress of the first progress bar is in a completion state; and the virtual resource is in an untriggerable state in a case where the progress of the first progress bar is in a non-completion state.

In a possible design, the interaction interface further displays a second progress bar, and a progress of the second progress bar corresponds to the interaction data.

In a possible design, the live video interface includes a plurality of target interaction controls, and each target interaction control corresponds to an interaction data interval, wherein the target interaction control corresponding to current interaction data is in a display state, and the remaining target interaction controls are displayed by triggering a contraction control.

In a possible design, each target interaction control corresponds to one interaction interface; and the method further includes:

switching, by sliding the interaction interface, the currently displayed interaction interface.

In a possible design, the displaying the interaction interface in response to triggering of the target interaction control includes:

displaying an interaction interface in response to triggering of the target interaction control, wherein the interaction interface includes a resource enable control; and displaying the virtual resource on the interaction interface in response to triggering of the resource enable control.

In a possible design, in the case where the progress of the first progress bar is in a completion state, after displaying the interaction interface in response to triggering of the target interaction control, the method further includes:

hiding the first progress bar corresponding to the target interaction control.

In a second aspect, the present disclosure provides an interaction apparatus including:

an updating module, configured to update, during a process of playing a live video in a live room, a display of a first progress bar, which is presented in a live video interface and corresponds to a target interaction control in response to a change of interaction data in the live room; and a display module, configured to display an interaction interface in response to triggering of the target interaction control, wherein the interaction interface includes a virtual resource corresponding to the interaction data.

In a possible design, the virtual resource is in a triggerable state in a case where a progress of the first progress bar is in a completion state; and the virtual resource is in an untriggerable state in a case where the progress of the first progress bar is in a non-completion state.

In a possible design, the interaction interface further displays a second progress bar, and a progress of the second progress bar corresponds to the interaction data.

In a possible design, the live video interface includes a plurality of target interaction controls, and each target interaction control corresponds to an interaction data interval, wherein the target interaction control corresponding to current interaction data is in a display state, and the remaining target interaction controls are displayed by triggering a contraction control.

In a possible design, each target interaction control corresponds to one interaction interface; the apparatus further includes a switching module; and the switching module is configured to switch, by sliding the interaction interface, the currently displayed interaction interface.

In a possible design, the display module is configured to:

display an interaction interface in response to triggering of the target interaction control, wherein the interaction interface includes a resource enable control; and display the virtual resource on the interaction interface in response to triggering of the resource enable control.

In a possible design, the apparatus further includes a hiding mean; and the hiding mean is configured to hide the first progress bar corresponding to the target interaction control.

The beneficial effects of the interaction apparatus provided in the second aspect and the possible designs of the second aspect can be referred to the beneficial effects brought by the first aspect and the possible implementations of the first aspect, and details will not be repeated here.

In a third aspect, the present disclosure provides an electronic device including a memory and a processor; the memory is configured to store program instructions; the processor is configured to invoke the program instructions in the memory to cause the electronic device to execute the interaction method in the first aspect and any possible design of the first aspect.

In a fourth aspect, the present disclosure provides a computer storage medium including computer instructions, when executed on an electronic device, cause the electronic device to execute the interaction method in the first aspect and any possible design of the first aspect.

In a fifth aspect, the present disclosure provides a computer program product, when executed on a computer, causes the computer to execute the interaction method in the first aspect and any possible design of the first aspect.

BRIEF DESCRIPTION OF DRAWINGS

The accompanying drawings are incorporated in and constitute a part of the specification, illustrate embodiments consistent with the present disclosure, and together with the specification, serve to explain the principles of the present disclosure.

In order to clearly illustrate the technical solution of the embodiments of the present disclosure or the prior art, the drawings needed in the description of the embodiments or the prior art will be briefly described in the following; it is obvious that those skilled in the art, without any inventive work, can obtain other drawing(s) according to these drawings.

FIG. 1 is a flowchart of an interaction method provided by an embodiment of the present disclosure;

FIGS. 2A-2F are schematic diagrams of an interaction interface provided by an embodiment of the present disclosure;

FIG. 5 is a flowchart of still another interaction method provided by an embodiment of the present disclosure; and FIG. 6 is a schematic structural diagram of an interaction apparatus provided by an embodiment of the present disclosure.

DETAILED DESCRIPTION

Figure 2B:
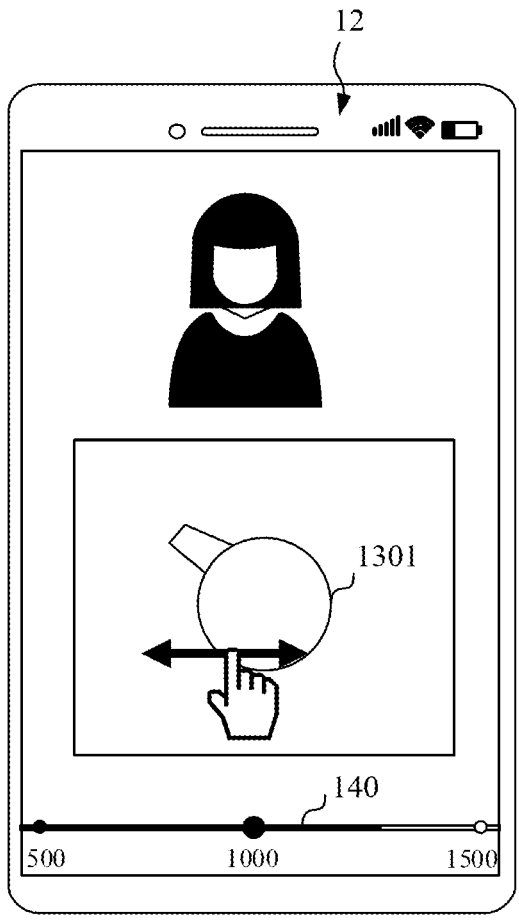

In order to make the above objects, characteristics and advantages of the present disclosure apparent, the technical solutions of the embodiments will be further described below. It should be noted that the embodiments of the present disclosure and the features in the embodiments can be combined with each other in case of no conflict.

In the following description, many specific details are set forth in order to fully understand the present disclosure, but the present disclosure may be implemented in other ways than those described herein; obviously, the embodiments in the specification are only part of the embodiments of the present disclosure, not all of them.

Illustratively, the present disclosure provides an interaction method, apparatus, device, computer readable storage medium and product, which can present, in a live room and based on interaction data generated by all users who are watching, an interaction interface for the users watching a live video in the live room, so that the users can obtain live rights in the interaction interface, thus facilitating the live interaction of all users in the live room. Thus, users are encouraged to actively interact and their willingness to interact is enhanced.

The interaction method of the present disclosure is performed by an electronic device or an application program, a webpage, an official account, etc. in the electronic device. The electronic device can be a tablet computer, a mobile phone, a wearable device, a vehicle-mounted device, an augmented reality (AR)/virtual reality (VR) device, a notebook computer, an ultra-mobile personal computer (UMPC), a netbook computer, a personal digital assistant (PDA), a smart TV, a smart screen, a high-definition TV, a 4K TV, a smart speaker, a smart projector and the like. The present disclosure does not limit the types of the electronic devices.

In the present disclosure, the type of the operating system of the electronic device is not limited. For example, it can be Android system, Linux system, Windows system, iOS system, and so on.

Refer to FIG. 1, FIG. 1 is a flowchart of an interaction method provided by an embodiment of the present disclosure. As shown in FIG. 1, the interaction method provided by the present disclosure may comprises:

S110: during the process of a live room playing a live video, in response to a change of interaction data in the live room, updating the display of a first progress bar, which is presented in a live video interface and corresponds to a target interaction control.

The live room can accommodate multiple users to watch the live video at the same time. In the process of watching the live video, the users can communicate and interact with the host or other users in the live room by own will, so as to improve the live-streaming popularity of the live room. For example, in a concert watched by many people, a user can present what they want to say in the live room through comments and other means by own will, so that multiple users can communicate and interact with each other in a live room.

In the present embodiment, various types of live videos can be presented in the live room, such as song singing, dance teaching and course teaching, etc. The presentation type of the live video is not limited in the present embodiment.

The interaction data is dynamic data generated by users watching the live video in the live room, for example, the interaction data can be the likes of the live video in the live room. The implementation of the interaction data in the live room is not limited in the present embodiment.

The target interaction control is presented in the live video interface, and is configured to show statistically the interaction data of all users who are watching in the live room. The target interaction control is an access to live rights, and each live right corresponds to an extra scene distributed in the live room. That is, when there is no extra scene in the live room, the target interaction control will not be presented in the live video interface.

For example, the specific presentation mode of the target interaction control may be referred to the presentation of the control 110 in the interface 11 illustratively shown in FIG.

2A (e.g., the control 1101 in the interface 11 illustratively shown in FIG. 2C below), and the presentation mode of the target interaction control can include various types. In some embodiments, the presentation mode of the target interaction control can be referred to the presentation mode of the control 110 in FIG. 2A, and the presentation mode of the target interaction control is not limited in the present embodiment.

The display of a first progress bar of the target interaction control, can be referred to the progress bar 120 in the interface 11 illustratively shown in FIG. 2A. The first progress bar is configured to record the interaction data of the audience in live room at the current stage of playing live video, such as the number of clicks at the current stage.

In FIG. 2A, the first progress bar of the target interaction control may include a plurality of display states, including but not limited to an initial state, a stage in progress state, a reward unviewed state, a stage completed and unviewed state, and a stage achievement state.

The display mode of the first progress bar of the target interaction control may be different in each display state, to facilitate users to intuitively and clearly understand the implementation stage of the live rights.

For example, the display states of the first progress bar in the initial state, the stage in progress state, the reward unviewed state, the stage completed and unviewed state can be the same, and the first progress bar, when being in the stage achieved state, can be changed to another display state, thereby effectively guiding users to click.

In addition, when displaying various display states, the first progress bar can also support dynamic effect display, such as jumping, zooming in and out, and rotating, to facilitate to attract users' attention. The specific implementation of the dynamic effect display of the first progress bar is not limited in the present embodiment.

When the first progress bar is in the initial state, the dynamic effect corresponding to the initial state starts to be played when the user enters the live room, and the initial dynamic effect may be hidden after being played for one loop, or the initial dynamic effect may be hidden if the user's trigger operation applied on the target interaction control is received.

When the first progress bar is in the stage achieved state, when the conditions for live rights are met, the server sends a message to the client, and the client displays an achievement dynamic effect corresponding to the stage achieved state; if the initial dynamic effect is still being played, the achievement dynamic effect starts to be displayed after the play of the initial dynamic effect is completed. The achievement dynamic effect may be hidden after being played for one loop, or may be hidden if the user's trigger operation applied on the target interaction control is received.

When the first progress bar is in the reward unviewed state, when the play of the achievement dynamic effect is completed, if the user's trigger operation applied on the target interaction control is not received, the client may display an unviewed dynamic effect; and the unviewed dynamic effect may be hidden upon the receiving of the user's trigger operation applied on the target interaction control.

The trigger operation mentioned above may include, but is not limited to, clicking, double clicking, etc.

Taking that the interaction data is the number of clicks as an example, the calculation rule of the first progress bar can be: first value/second value. The first value can be the current number of likes/the number of likes needed for the previous extra scene, and the second value can be the number of likes needed for the next extra scene/the number of likes needed for the previous extra scene. If the live rights correspond to the first extra scene, the number of likes needed for the previous extra scene mentioned above can be 0.

The first progress bar may include two display states, such as hidden and display.

For example, when the user just enters the live room, the initial dynamic effect is played for n loops; at this time, the first progress bar is not displayed, and after the play is completed, the progress bar is displayed, where n can be 3 and is released by the server. When playing the dynamic effect, the first progress bar can be hidden, and after the play of the dynamic effect is completed, the first progress bar is then displayed. If all stages have been achieved, the first progress bar may be hidden.

S120: in response to triggering of the target interaction control, displaying an interaction interface, wherein the interaction interface comprises a virtual resource corresponding to the interaction data.

The user may perform a trigger operation applied on the target interaction control presented in the live video interface, and the client may jump from the live video interface to the interaction interface.

The interaction interface displayed in the live video interface may be presented for some users, such as those who have performed a pay operation in the live room. At the same time, users who have not paid may perform a pay operation according to the payment instructions in the live room, so as to watch the interaction interface displayed in the live video interface.

The presentation of the interaction interface can be referred to the interface 12 illustratively shown in FIG. 2B. The virtual resource corresponding to the interaction data may be presented in the interface 12, and the specific presentation form of the virtual resource corresponding to the interaction data can be referred to the presentation of the resource 1301 in the interface 12.

The interaction method provided by the embodiment of the present disclosure may update, during a process of playing a live video in a live room, a display of a first progress bar, which is presented in a live video interface and corresponds to a target interaction control according to a change of interaction data in the live room, so that the user can intuitively understand the change of the interaction data according to the first progress bar, and can determine whether to obtain the virtual resource according to the first progress bar, and display an interaction interface through the user's triggering of the target interaction control, and display a virtual resource corresponding to the interaction data on the interaction interface, so as to increase the interest of interaction, enhance the user's willingness to interact and improve the user's stickiness.

Based on the above description of the embodiment, in the present embodiment, the display state of the virtual resource corresponding to the interaction data may include two display states, namely, a triggerable state and an untriggerable state.

The triggerable state means that the virtual resource can be collected, and the untriggerable state means that the virtual resource cannot be collected.

It should be noted that in the present embodiment, when the virtual resource is in the untriggerable state, the virtual resource will still be displayed, which is convenient for users to know the virtual resource corresponding to the current stage, thus encouraging users to enhance their interaction awareness.

In the present embodiment, in a possible implementation, in the case where the progress of the first progress bar is in a completion state, the virtual resource is in a triggerable state; and In the case where the progress of the first progress bar is in a non-completion state, the virtual resource is in an untriggerable state.

The first progress bar can intuitively reflect the data statistics of the current stage in the live room. The completion state of the progress of the first progress bar corresponds to the above-mentioned achievement state.

Therefore, according to whether the first progress bar is in the completion state or not, the trigger state of the virtual resource can be marked, and the trigger state of the virtual resource can be correspondingly presented, so that the effective management of the virtual resource can be realized, and the virtual resource can be truly presented.

The virtual resource can include two specific embodiment forms, such as a live room performance right and a custom reward.

The live room performance right is for the user who has purchased a ticket, after the reward is unlocked, the user who has purchased a ticket can use the reward. The reward may include but is not limited to a support gift, a shooting right and a hidden poster.

If a user doesn't get a reward, the user may be prompted to "participate in like and support, and unlock more rights". If a user has gotten some rewards, the user may be prompted to "have won n rewards, continue to like and support". If a user has gotten all the rewards, the user may be prompted to "have won all the rewards, and continue to participate in like and support".

The reward is a support gift. After the reward is achieved, the gift is displayed in the gift bar of the user who has purchased a ticket in the live room, and there is a button to quickly open a gift panel and switch to the gift. The display icon of the support gift can be referred to the reward icon configured by the back-end, and there is no all-detail revealing default icon at the front-end. "Go to View" may be displayed in the icon. The user clicks "Go to View" to close the rights panel and call the gift bar panel.

The reward is a shooting right. After the reward is achieved, the user who has purchased a ticket in the live room can use a shooting resource button in the rights backpack. The number of shoots and the shooting resource have an upper usage limit, and the number of shoots are configured by the back-end. The display icon of the shooting right can be referred to the reward icon configured by the back-end, and there is an all-detail revealing default icon at the front-end. "Shoot Now" may be displayed in the icon. The user clicks "Shoot Now" to close the rights panel and call a process of sharing highlight moments.

The reward is a hidden poster. After the reward is achieved, the user who has purchased a ticket in the live room has a button in the rights backpack to quickly call the capability to share posters. The display icon of the hidden poster can be referred to the reward icon configured by the back-end, and there is an all-detail revealing default icon at the front-end. "Share Poster" may be displayed in the icon. The user clicks "Share Poster" to close the rights panel and call a process of sharing live-streaming posters.

The custom reward is released by the operator or the host in other ways, and there is no need for the server to associate other functions of the client. After receiving the message from the server, the client informs the user in time. There is no specific icon at the back-end corresponding to the display icon of the custom reward, which can be referred to the all-detail revealing default icon at the front-end.

The custom reward can include but is not limited to: opening a blessing bag, offline concert extra scenes, and helping the host to be trending.

Based on the above description of the embodiment, in addition to the first progress bar, a second progress bar may further be displayed on the interaction interface, wherein the second progress bar is configured to show all interaction data of the live video.

In the present embodiment, in a possible implementation, the interaction interface further displays a second progress bar, and the progress of the second progress bar corresponds to the interaction data.

The second progress bar may be displayed on the interaction interface, and configured to count all the interaction data in the live room.

In addition to displaying the virtual resource, the interaction interface may further display the second progress bar counted according to the interaction data corresponding to the virtual resource, thus facilitating the user to view the real-time interaction data in the live room.

The specific presentation form of the second progress bar may be referred to the progress bar 140 in the interface 12 illustratively shown in FIG. 2B.

The second progress bar may be marked for different stages; for example, the number of likes at the first stage is 0-500, the number of likes at the second stage is 500-1000, and the number of likes at the third stage is 1000-1500.

At the same time, the virtual resource displayed in the interaction interface correspond to the mark in the second progress bar.

In addition, the mark in the second progress bar corresponding to the virtual resource displayed in the interaction interface may be highlighted, thus facilitating users to intuitively position the current stage displayed in the live room.

The display mode of the second progress bar may not be limited to the display mode of the progress bar 140 in the interface 12, but may be any one of the display modes of the progress bar, without being limited in the present embodiment.

Based on the above description of the embodiment, the live video interface may include other target interaction controls in addition to the one target interaction control.

In the present embodiment, in a possible implementation, the live video interface includes a plurality of target interaction controls, and each target interaction control corresponds to an interaction data interval, wherein the target interaction control corresponding to current interaction data is in a display state, and the remaining target interaction controls are displayed by triggering a contraction control.

The contraction control is a virtual control that contracts and stores a plurality of target interaction controls, and is configured to contract and expand the plurality of target interaction controls. The specific presentation form of the contraction control can be referred to the presentation of the control 150 in the interface 11 illustratively shown in FIG. 2A.

Therefore, on the basis of displaying one target interactive control, the target interactive controls corresponding to a plurality of stages may also be displayed, thus facilitating users to view the plurality of target interactive controls so as to fully understand the live stream video.

After the user enters the virtual livestream room, if there is no completed stage or the completed stage has been viewed, positioning to the ongoing stage, in response to the user's entry operation on the virtual livestream room, for the user to view.

If there are a plurality of completed stages that have not been viewed, positioning to the last stage that has not been viewed. Thus facilitating users to view the latest stage that has not been viewed, and improving the viewing timeliness of users.

If all stages have been completed and viewed, the last stage is positioned. Thus facilitating users to view an unviewed stage.

Figure 2C:
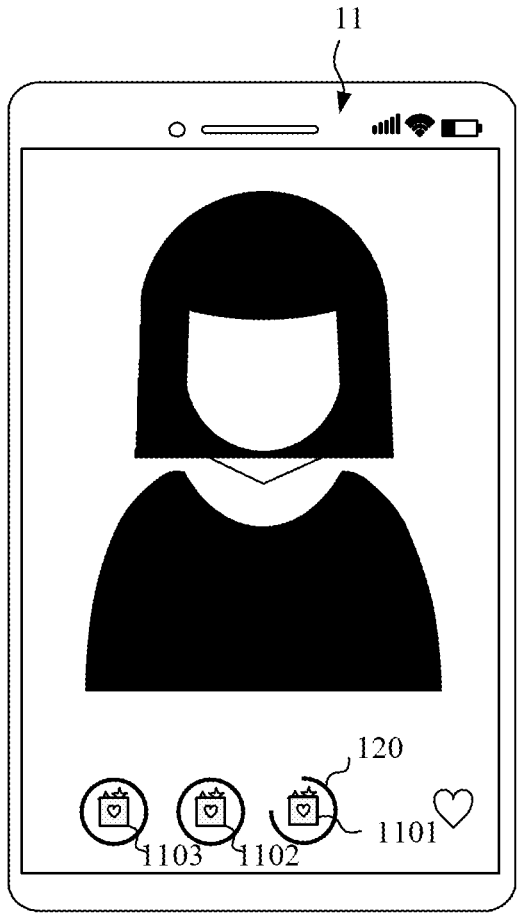

Upon receiving a user's trigger operation applied on the contraction control, the interface 11 illustratively shown in FIG. 2C can be presented. The interface 11 further includes a target interaction control 1102 and a target interaction control 1103. The state of the first progress bar of the target interaction control 1102 and the state of the first progress bar of the target interaction control 1103 can be completion states.

Figure 3:
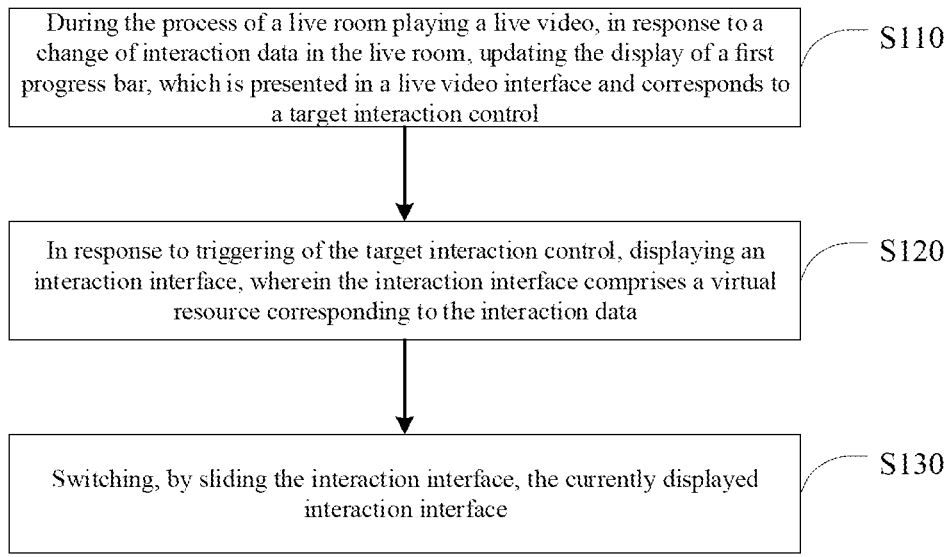
FIG. 3 is a flowchart of another interaction method provided by an embodiment of the present disclosure.

FIG. 3 is a flowchart of another interaction method provided by the present embodiment. The present embodiment is based on the above embodiments, and further, each target interaction control corresponds to one interaction interface. After S120, the method of the present embodiment can further include:

S130: switching, by sliding the interaction interface, the currently displayed interaction interface.

A slide operation may be performed on the area where the virtual resource is displayed on the interaction interface, thus facilitating users to view other unlocked live rights among the live rights.

Figure 2D:
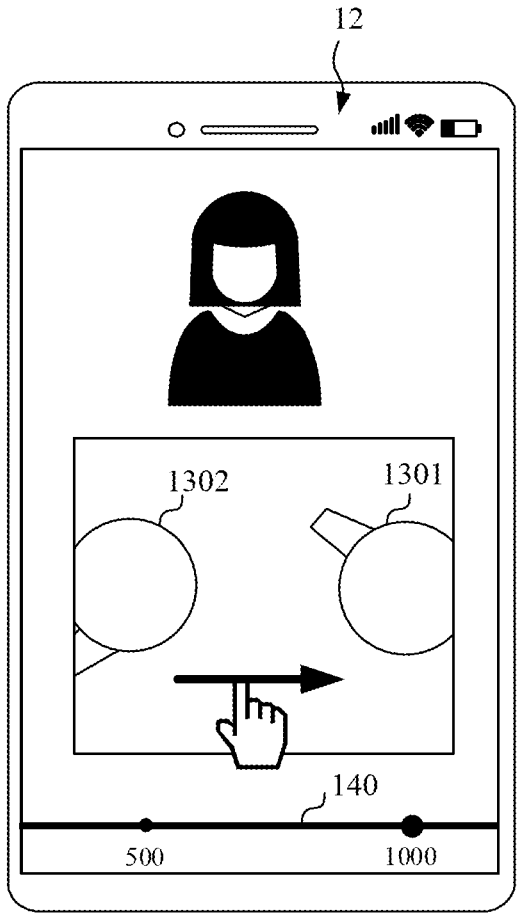

Sliding to right is taken as an example to show the sliding process, and the specific presentation form of the sliding process of the interaction interface can be referred to the presentation of the interface 12 illustratively shown in FIG. 2D.

Figure 2E:
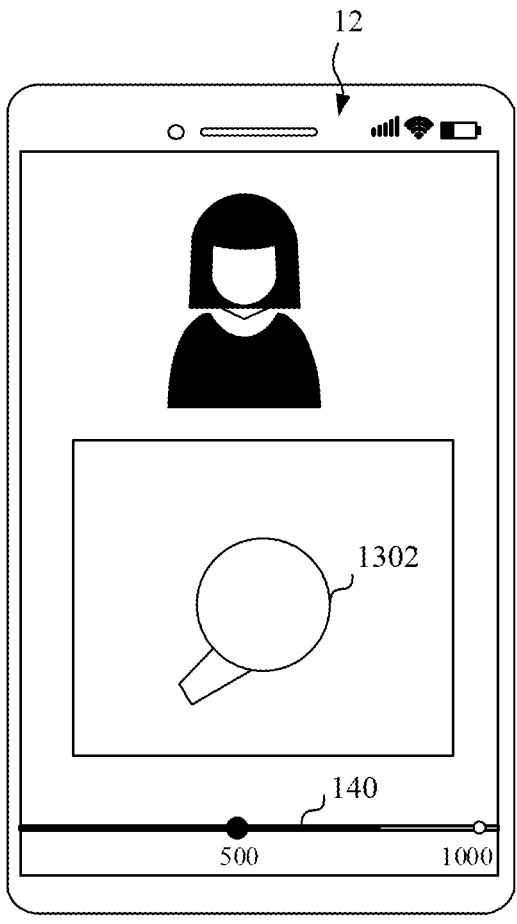

The specific presentation form of the interaction interface after sliding can be referred to the display of the interface 12 illustratively shown in FIG. 2E. The virtual resource 1302 is another virtual resource in the interaction interface, and a stage corresponding thereto can be the stage where 0-500 is located.

The virtual resource in the interaction interface may include two presentation modes, which may include triggerable and untriggerable modes. The triggerable may be the colored virtual resource presented in the interaction interface may be, and the untriggerable may be grey virtual resource presented in the interaction interface.

By setting the area where the interaction interface is located to display a plurality of virtual resources, the plurality of virtual resources can be scanned and browsed in response to the user's slide operation applied on the interaction interface, thus facilitating the user to know and view a plurality of live rights contained in the live video.

Figure 4:
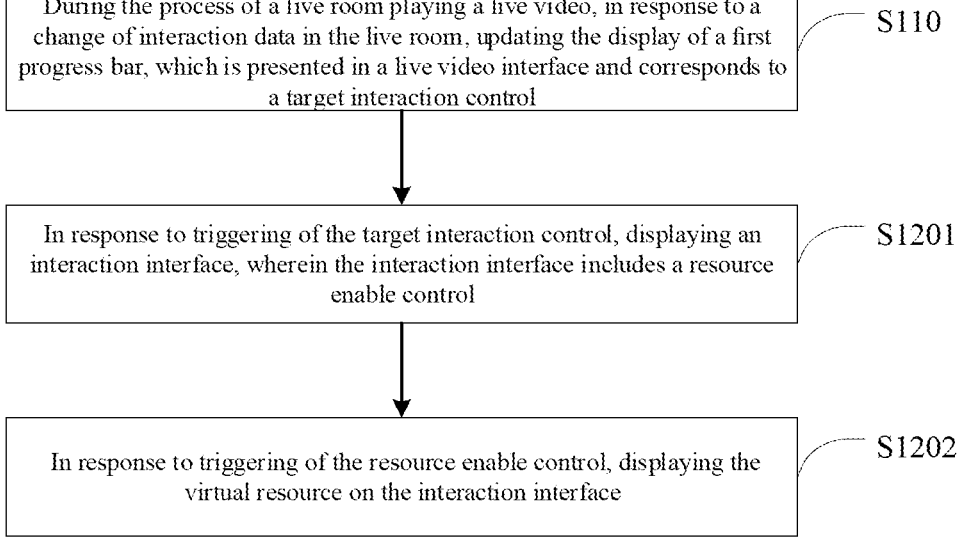
FIG. 4 is a flowchart of further another interaction method provided by an embodiment of the present disclosure.

FIG. 4 is a flowchart of further another interaction method provided by the present embodiment. The present embodiment is based on the above embodiments, wherein a possible implementation of S120 is as follows:

S1201: in response to triggering of the target interaction control, displaying an interaction interface, wherein the interaction interface includes a resource enable control.

An enable control of the virtual resource can be presented in the interaction interface, and the enable control is configured to display the virtual resource in the interaction interface after receiving, for example, a click operation triggered by the user.

10

Figure 2F:
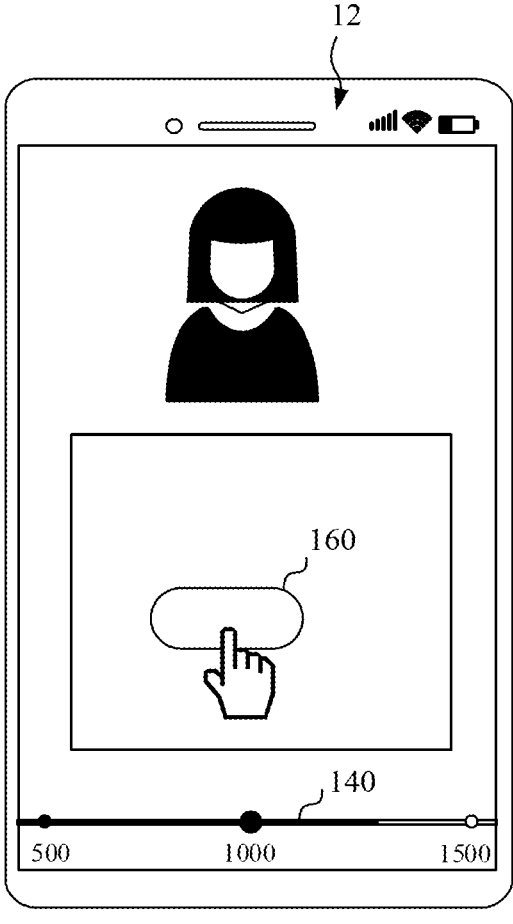

The specific presentation mode of the enable control can be referred to the presentation of the control 160 illustratively shown in FIG. 2F.

S1202: in response to triggering of the resource enable control, displaying the virtual resource on the interaction interface.

The user can view, by a trigger operation applied on the enable control, the virtual resource corresponding to the selected target interaction control on the interaction interface, thus facilitating the effective use of the virtual resource by the user, and enhancing the user's interest in watching the live video by means of releasing the virtual resource.

FIG. 5 is a flowchart of still another interaction method provided by the present embodiment. The present embodiment is based on the above embodiments, and in the case where the progress of the first progress bar is in a completion state, after S120, the method of the present embodiment may further include:

S140: hiding the first progress bar corresponding to the target interaction control.

In the case where the first progress bar corresponding to the target interaction control is in the completion state, it means that the first progress bar is full and the display stage corresponding to the target interaction control has been achieved. In order to reduce the influence of the first progress bar on the viewing angle of the user in the interaction interface, the first progress bar corresponding to the target interaction control can be hidden in the case where the progress of the first progress bar is in the completion state.

Therefore, in the case where the progress of the first progress bar is in the completion state, the first progress bar corresponding to the target interaction control is hidden, so that the live rights in different states can be effectively marked in the interaction interface, and the user can clearly view the completed live rights.

FIG. 6 is a schematic structural diagram of an interaction apparatus provided by the present disclosure. As shown in FIG. 6, the interaction apparatus 600 of the present embodiment includes an updating module 610 and a display module 620, wherein:

the updating module 610 is configured to update, during a process of playing a live video in a live room, a display of a first progress bar, which is presented in a live video interface and corresponds to a target interaction control in response to a change of interaction data in the live room; and the display module 620 is configured to display an interaction interface in response to triggering of the target interaction control, wherein the interaction interface includes a virtual resource corresponding to the interaction data.

In some embodiments, the virtual resource is in a triggerable state in a case where a progress of the first progress bar is in a completion state; and the virtual resource is in an untriggerable state in a case where the progress of the first progress bar is in a non-completion state.

In some embodiments, the interaction interface further displays a second progress bar, and a progress of the second progress bar corresponds to the interaction data.

In some embodiments, the live video interface includes a plurality of target interaction controls, and each target interaction control corresponds to an interaction data interval, wherein the target interaction control corresponding to current interaction data is in a display state, and the remaining target interaction controls are displayed by triggering a contraction control.

In some embodiments, each target interaction control corresponds to one interaction interface;

the apparatus of the present embodiment further includes: a switching module; and the switching module is configured to switch, by sliding the interaction interface, the currently displayed interaction interface.

In some embodiments, the display module 620 is specifically configured to:

display an interaction interface in response to triggering of the target interaction control, wherein the interaction interface includes a resource enable control; and display the virtual resource on the interaction interface in response to triggering of the resource enable control.

In some embodiment, the apparatus of the present embodiment further includes: a hiding mean; and the hiding mean is configured to hide the first progress bar corresponding to the target interaction control.

The interaction apparatus provided by the present disclosure can execute the above-mentioned method embodiments, and the specific implementation principle and technical effects can be referred to the above-mentioned method embodiments, which will not be repeated in the present disclosure.

Illustratively, the present disclosure provides an electronic device including: one or more processors; a memory; and one or more computer programs; wherein the one or more computer programs are stored in the memory; the one or more computer programs, when executed by the one or more processors, cause the electronic device to execute the interaction method of the foregoing embodiments.

Illustratively, the present disclosure provides a chip system, which is applied to an electronic device including a memory and a sensor; the chip system includes a processor; and the processor can execute the interaction method of the foregoing embodiments.

Illustratively, the present disclosure provides a computer readable storage medium, on which a computer program is stored, and the computer program, when executed by a processor, causes an electronic device to executed the interaction method of the foregoing embodiments.

Illustratively, the present disclosure provides a computer program product, and the computer program product, when executed on a computer, causes the computer to perform the interaction method of the foregoing embodiments.

In the above embodiments, all or part of the functions can be implemented by software, hardware, or a combination thereof. When implemented in software, it can be implemented in whole or in part in the form of a computer program product. The computer program product includes one or more computer instructions. The computer program instructions, when loaded and executed on a computer, can generate in whole or in part the processes or functions according to embodiments of the present disclosure. The computer may be a general purpose computer, a special purpose computer, a computer network, or other programmable device. The computer instructions may be stored in a computer readable storage medium. The computer readable storage medium can be any available medium that can be accessed by a computer or a data storage device such as a server, data center, or the like that contains one or more of the available media integrated therein. The available media may be magnetic media (e.g., floppy disks, hard disks, magnetic tapes), optical media (e.g., DVDs), or semiconductor media (e.g., solid state disks (SSDs)), and the like.

It should be noted that in the present disclosure, relational terms, such as "first" and "second", etc., are merely used to distinguish one entity or operation from another entity or operation, and do not necessarily require or imply that there is any such factual relationship or order between these entities or operations. Moreover, the terms "including", "comprising" or any other variation thereof are intended to cover non-exclusive inclusion, so that a process, method, article or apparatus including a series of elements includes not only these elements, but also other elements not explicitly listed or elements inherent to such process, method, article or apparatus. Without further restrictions, an element defined by the phrase "including a/an . . . " does not exclude the existence of other identical elements in the process, method, article or apparatus including the element.

What has been described above is only the specific embodiments of the present disclosure, so that those skilled in the art can understand or realize the present disclosure. Various modifications to these embodiments will be obvious to those skilled in the art, and the general principles defined herein can be implemented in other embodiments without departing from the spirit or scope of the present disclosure. Therefore, the present disclosure will not be limited to the embodiments described herein, but is to be accorded the broadest scope consistent with the principles and novel features disclosed herein.

The invention claimed is:

1. An interaction method, comprising:

during a process of live streaming, displaying a first progress display component indicating a number of interactions of users in a live-stream video interface, wherein the first progress display component corresponds to a first interaction control;

updating, during the process of live streaming, a display progress state of the first progress display component in response to a change of the number of interactions of users, wherein the number of interactions of users is dynamic data generated by the users watching the live-stream video; and displaying an interaction interface in response to triggering of the first interaction control, wherein the interaction interface comprises a virtual resource corresponding to interaction data, wherein the live-stream video interface comprises a plurality of first interaction controls, and each first interaction control corresponds to an interaction data interval, wherein the first interaction control corresponding to current interaction data is in the display progress state, and the remaining first interaction controls are displayed by triggering a contraction control.

2. The method according to claim 1, wherein the virtual resource is in a triggerable state in a case where a progress of the first progress display component is in a completion state; and the virtual resource is in an untriggerable state in a case where the progress of the first progress display component is in a non-completion state.

3. The method according to claim 2, wherein the interaction interface further displays a second progress display component, and a progress of the second progress display component corresponds to the interaction data.

4. The method according to claim 2, wherein in the case where the progress of the first progress display component is in a completion state, after displaying the interaction interface in response to triggering of the first interaction control, the method further comprises:

hiding the first progress display component corresponding to the first interaction control.

5. The method according to claim 1, wherein each first interaction control corresponds to one interaction interface; and the method further comprises:

switching, by sliding the interaction interface, the currently displayed interaction interface.

6. The method according to claim 1, wherein the displaying the interaction interface in response to triggering of the first interaction control comprises:

displaying an interaction interface in response to triggering of the first interaction control, wherein the interaction interface comprises a resource enable control; and displaying the virtual resource on the interaction interface in response to triggering of the resource enable control.

7. An interaction apparatus, comprising:

a display module, configured to, during a process of live streaming, display a first progress display component indicating a number of interactions of users in a live-stream video interface, wherein the first progress display component corresponds to a first interaction control; and an updating module, configured to update, during the process of live streaming, a display progress state of the first progress display component in response to a change of the number of interactions of users, wherein the number of interactions of users is dynamic data generated by the users watching the live-stream video, wherein the display module is further configured to display an interaction interface in response to triggering of the first interaction control, wherein the interaction interface comprises a virtual resource corresponding to interaction data, and the live-stream video interface comprises a plurality of first interaction controls, and each first interaction control corresponds to an interaction data interval, wherein the first interaction control corresponding to current interaction data is in the display progress state, and the remaining first interaction controls are displayed by triggering a contraction control.

8. The interaction apparatus according to claim 7, wherein the virtual resource is in a triggerable state in a case where a progress of the first progress display component is in a completion state; and the virtual resource is in an untriggerable state in a case where the progress of the first progress display component is in a non-completion state.

9. The interaction apparatus according to claim 8, wherein the interaction interface further displays a second progress display component, and a progress of the second progress display component corresponds to the interaction data.

10. The interaction apparatus according to claim 8, wherein in the case where the progress of the first progress display component is in a completion state, after displaying the interaction interface in response to triggering of the first interaction control, the method further comprises:

hiding the first progress display component corresponding to the first interaction control.

11. The interaction apparatus according to claim 7, wherein each first interaction control corresponds to one interaction interface; and the method further comprises:

switching, by sliding the interaction interface, the currently displayed interaction interface.

12. The interaction apparatus according to claim 7, wherein the displaying the interaction interface in response to triggering of the first interaction control comprises:

displaying an interaction interface in response to triggering of the first interaction control, wherein the interaction interface comprises a resource enable control; and displaying the virtual resource on the interaction interface in response to triggering of the resource enable control.

13. An electronic device, comprising: one or more processors; a memory; and one or more computer programs; wherein the one or more computer programs are stored in the memory; the one or more computer programs, when executed by the one or more processors, cause the electronic device to execute an interaction method and the interaction method comprises:

during a process of live streaming, displaying a first progress display component indicating a number of interactions of users in a live-stream video interface, wherein the first progress display component corresponds to a first interaction control;

updating, during the process of live streaming, a display progress state of the first progress display component in response to a change of the number of interactions of users, wherein the number of interactions of users is dynamic data generated by the users watching the live-stream video; and displaying an interaction interface in response to triggering of the first interaction control, wherein the interaction interface comprises a virtual resource corresponding to interaction data, wherein the live-stream video interface comprises a plurality of first interaction controls, and each first interaction control corresponds to an interaction data interval, wherein the first interaction control corresponding to current interaction data is in the display progress state, and the remaining first interaction controls are displayed by triggering a contraction control.

14. The electronic device according to claim 13, wherein the virtual resource is in a triggerable state in a case where a progress of the first progress display component is in a completion state; and the virtual resource is in an untriggerable state in a case where the progress of the first progress display component is in a non-completion state.

15. The electronic device according to claim 14, wherein the interaction interface further displays a second progress display component, and a progress of the second progress display component corresponds to the interaction data.

16. The electronic device according to claim 13, wherein each first interaction control corresponds to one interaction interface; and the method further comprises:

switching, by sliding the interaction interface, the currently displayed interaction interface.

17. The electronic device according to claim 13, wherein the displaying the interaction interface in response to triggering of the first interaction control comprises:

displaying an interaction interface in response to triggering of the first interaction control, wherein the interaction interface comprises a resource enable control; and displaying the virtual resource on the interaction interface in response to triggering of the resource enable control.

18. A non-transitory computer storage medium, comprising computer instructions that, when executed on an electronic device, cause the electronic device to execute an interaction method and the interaction method comprises:

during a process of live streaming, displaying a first progress display component indicating a number of interactions of users in a live-stream video interface, wherein the first progress display component corresponds to a first interaction control;

updating, during the process of live streaming, a display progress state of the first progress display component in response to a change of the number of interactions of users, wherein the number of interactions of users is dynamic data generated by the users watching the live-stream video; and displaying an interaction interface in response to triggering of the first interaction control, wherein the interaction interface comprises a virtual resource corresponding to interaction data, wherein the live-stream video interface comprises a plurality of first interaction controls, and each first interaction control corresponds to an interaction data interval, wherein the first interaction control corresponding to current interaction data is in the display progress state, and the remaining first interaction controls are displayed by triggering a contraction control.

19. The non-transitory computer storage medium according to claim 18, wherein the virtual resource is in a triggerable state in a case where a progress of the first progress display component is in a completion state; and the virtual resource is in an untriggerable state in a case where the progress of the first progress display component is in a non-completion state.

20. The non-transitory computer storage medium according to claim 19, wherein the interaction interface further displays a second progress display component, and a progress of the second progress display component corresponds to the interaction data.

* * * * *